United States Patent

Rossmy

[11] 4,136,239
[45] Jan. 23, 1979

[54] PROCESS FOR PREPARING POLYSILOXANE-POLYOXYALKYLENE MIXED BLOCK POLYMERIZATES

[75] Inventor: Gerd Rossmy, Essen-Werden, Germany

[73] Assignee: Th. Goldschmidt AG, Germany

[21] Appl. No.: 821,373

[22] Filed: Aug. 3, 1977

Related U.S. Application Data

[63] Continuation of Ser. No. 653,242, Jan. 28, 1976, abandoned.

[30] Foreign Application Priority Data

Feb. 6, 1975 [GB] United Kingdom ................ 5160/75

[51] Int. Cl.² .......................... C08G 18/14; C08K 5/54
[52] U.S. Cl. .................................... 521/111; 252/351; 521/112; 521/174
[58] Field of Search ................................. 260/2.5 AH

[56] References Cited

U.S. PATENT DOCUMENTS

3,532,732  10/1970  Rossmy ............................. 260/448.2

Primary Examiner—C. Warren Ivy
Attorney, Agent, or Firm—James E. Bryan

[57] ABSTRACT

This invention relates to a process for preparing polysiloxane-polyoxyalkylene block copolymerizates at whose polysiloxane block are laterally bonded at least two polyoxyalkylene blocks, and which contain at least two structural units having the formula

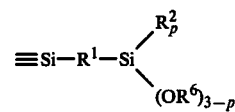

wherein $R^1$ is an alkylene group, $R^2$ is a monovalent hydrocarbon group and/or a trialkylsilyloxy group, $OR^6$ is a polyoxyalkylene block derived from an alcohol $R^6OH$, and $p = 1$ or 2, which comprises adding onto polysiloxanes with SiH groups silanes having the formula

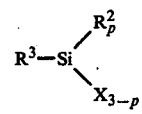

wherein $R^3$ is an alkenyl group and X a halogen or an alkoxy group, and reacting this intermediate product with a polyoxyalkylene monool. The invention also relates to novel compounds produced by the process.

3 Claims, No Drawings

PROCESS FOR PREPARING POLYSILOXANE-POLYOXYALKYLENE MIXED BLOCK POLYMERIZATES

This is a continuation of application Ser. No. 653,242, filed Jan. 28, 1976, now abandoned.

The present invention relates to a process for preparing polysiloxanepolyoxyalkylene block copolymerizates, at whose polysiloxane block are laterally bonded at least two polyoxyalkylene blocks, and which contain at least two structural units having the formula

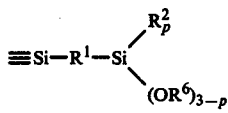

wherein $R^1$ is an alkylene group, $R^2$ is a monovalent hydrocarbon group and/or a trialkylsilyloxy group, $OR^6$ is a polyoxyalkylene block derived from an alcohol $R^6OH$, and $p = 1$ or 2. The designation 'lateral' means that the mixed block polymerizate has the structure of a comb or of a rake. Polyoxyalkylene blocks are joined to a polysiloxane chain in a comb-like manner by way of separate bridging members.

Already known are processes for preparing block polymers having a comb-like structure. Thus it is possible, for example, to link the polyoxyalkylene blocks with the polysiloxane blocks by way of SiOC bridges. In this case one reacts organo-polysiloxanes having SiH groups with polyoxyalkylene monools, with hydrogen being split-off at that time, while catalyzed by organotin compounds. This reaction may be illustrated by the following reaction equation:

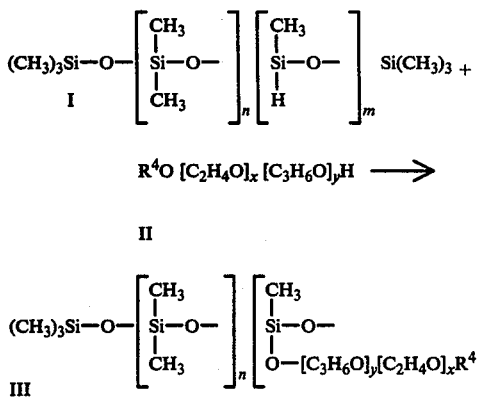

In this case, the indices n, m, x, and y are integers. $R^4$ may be, for example, a lower alkyl group, for instance a butyl group. Formed thereby are the compounds of formula II by virtue of the fact that added to a lower alcohol, for example butanol, are ethylene oxide and propylene oxide either simultaneously, successively, or alternately.

In this process it is a disadvantage that secondary reactions take place which alter the structure of the block polymers in an unpredictable manner. The SiOC linking points of the blocks are positioned at trifunctional silicon atoms. This has the result that these linking points may be hydrolytically split-off particularly easily. Moreover, the storability of the products obtained from the process is impaired due to the tin catalysts used and which remain in the system.

It is also possible, however, to prepare block polymers of this type having a comb-like structure in which one carbon atom of the polyoxyalkylene block is connected with one silicone atom of the polysiloxane block by way of an alkylene bridge. In this case, polysiloxanes, for example those of formula I, are reacted with a polyether analogous to formula II, in which case, however, the $R^4$ group is terminally unsaturated, and may be, for example, a vinyl- or allyl group, and the terminal hydroxyl group is alkylated or acetylated into a non-reactive alkoxy or acetoxy group. The reaction proceeds in the form of an addition of the unsaturated hydrocarbon to the SiH group with catalysis by platinum compounds. While the products obtained from this process are stable to hydrolysis, it is a disadvantage that one must begin from polyoxyalkylene compounds which can be prepared only in a relatively expensive manner. In addition thereto, it is possible that the siloxane frame of the polysiloxane block may become rearranged during the addition reaction, for example with an exchange of SiOSi- and SiH bonds. The result thereof is a poor reproducibility of the final products, as well as a formation of secondary products which may be an adverse factor during use of the products obtained from the process. An essential field of use or application of such mixed block polymerizates is foam stabilization in the preparation of polyurethane foams. In this case the secondary products may act in a foam-destroying manner.

It is the object of the present process to prepare polysiloxanepolyoxyalkylene mixed block polymerizates with lateral, i.e. comb-like bonded polyoxyalkylene blocks, in which the linkage of the polyoxyalkylene blocks with the polysiloxane blocks is effected by way of SiOC bonds, but in which the silicon atom of these SiOC bridges is mono- or difunctional. Mono- or difunctional silicon atoms are defined to mean, in a polysiloxane block, those silicon atoms which are linked with one or two oxygen atoms. Such mixed block polymerizates have in the neutral or slightly alkaline range an excellent stability to hydrolysis which is entirely sufficient for their customary use.

Furthermore, it is another object of the present invention to provide a process in which the products obtained from the process are obtained largely with the elimination of secondary reactions in order, on the one hand, to guarantee an excellent reproducibility and, on the other hand, to make it possible to systematically vary the structure of the products obtained from the process with respect to their synthesis.

These objects are obtained, according to the present invention, in that initially added on, in known manner, to polysiloxanes having SiH groups are silanes having the formula

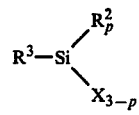

wherein $R^3$ is an alkenyl group and X is a halogen or an alkoxy group. This intermediate product is reacted in an equally known manner with polyoxyalkylene monools, if desired together with polyoxyalkylene diols, or lower monovalent alcohols. The possibility that $R^2$ may be a trialkylsilyloxy group preferably applies when p = 1. Preferred as a trialkylsilyloxy group is the group (CH₃)₃SiO.

Particularly preferred in this case as starting polysiloxanes are those organo-polysiloxanes which have 2 to 30, particularly 3 to 15, SiH groups in the average molecule. The organic groups at the silicon should be free from aliphatic double bonds. There is less restriction, however, with respect to the choice of the groups at the silicon atoms, and the groups customarily employed in silicon chemistry may be selected. Preferred are methyl groups at the silicon. Particularly preferred are those polysiloxanes whose average molecular weight is approximately 500 to 12,000, preferably 850 to 7500. For reasons of reproducibility, those polysiloxanes are preferred which are in balance with respect to the molecular weight distribution thereof and the distribution of the various organo-siloxane units. This balance is designated as an equilibrated condition in silicon-organic chemistry, whereby the equilibration may be carried out in known manner familiar to those skilled in the art.

The organo-polysiloxanes employed as starting compounds contain the following structural elements: $R_2^5SiO$; $R^5(H)SiO$; $R_3^5SiO_{0.5}$ and/or $R_2^5(H)SiO_{0.5}$ and/or $R_2^5Si(Y)O_{0.5}$. $R^5$ is preferably a methyl group. $R^5$, however, also may be: —C₂H₅; n—C₃H₇—; n—C₈H₁₇—; —CH₂—Br; —(CH₂)₃Cl;

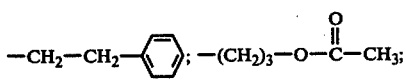

—(CH₂)₂—CF₃;

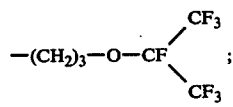

—(CH₂)₃—O—Alkyl; phenyl. Y may be selected from the following groups: a halogen group, preferably chlorine; an alkoxy group, preferably having 1 to 4 carbon atoms; an organo-sulfonic acid group in which in the polysiloxane Y may be a sulfonic acid group as well as a chlorine group side by side. The preparation of siloxanes with terminal organo-sulfonic acid groups has been described, for example, in German Auslegeschrift No. 2,331,677.

The following groups also may be contained in the organo-polysiloxane serving as starting material:

$R^5SiO_{1.5}$; $SiO_2$; $HSiO_{1.5}$; $H_2SiR^5O_{0.5}$;

$O_{0.5}Si(R^5)_2$—M—$Si(R^5)_2O_{0.5}$, wherein M is a bivalent hydrocarbon group preferably having 1 to 6 carbon atoms; or H₂SiO.

There also may be further contained in the starting polysiloxane minor, negligible, or manufacture-resulting quantities of other chain-continuing or chain-delimiting structural units.

Several examples of starting compounds for the inventive process are shown hereinafter, wherein what is involved are average formulas of polysiloxanes:

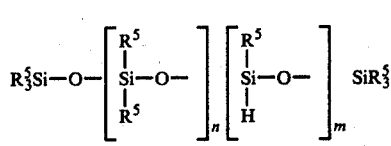

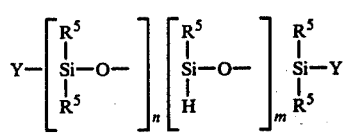

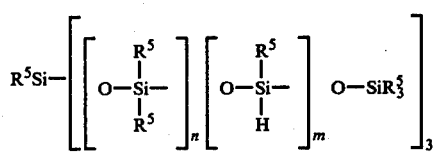

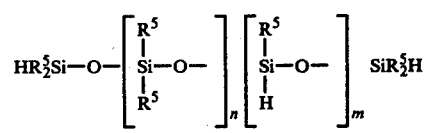

The groups $R^5$ and Y have the meanings stated above. The indices n and m have been so chosen that they correspond to the above-specified preferred conditions with respect to the number of the SiH groups and the molecular weight. The preparation of such siloxanes by, if desired, partial hydrolysis of corresponding silanes and the equilibration of the siloxanes resulting therefrom are familiar to those skilled in the art and may be found in the book *Chemie und Technologie der Silicone* (*Chemistry and Technology of the Silicones*) by Walter Noll, Verlag (Publisher) Chemie (Chemistry) GmbH.

In the first process step of the inventive process, the starting polysiloxanes are reacted with alkenyl group-containing silanes having the formula

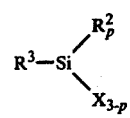

The $R^2$ group is a monovalent hydrocarbon group and has the meaning indicated for the group $R^5$, or is a trialkylsiloxy group. $R^2$ is preferably a lower alkyl group having 1 to 4 carbon atoms, particularly a methyl group. The group X is a halogen or alkoxy group in which chlorine is preferred as the halogen. The group $R^3$ is an alkenyl group, preferably with a terminal double bond and 2 to 8 carbon atoms. Particularly preferred are the vinyl and allyl groups. The integer p has a value of 1 or 2. If the integer p has the value = 1, in this case X also may be the group $R_3^5SiO$. Preferred compounds of formula VIII are vinyl-methyl-dichlorosilane, vinyl-dimethyl-chlorosilane, vinyl-butyl-methylchlorosilane, trimethyl-siloxymethyl-vinylchlorosilane, as well as those compounds which contain the allyl group instead of the vinyl group.

The reaction in this first step takes place under known conditions of the hydrosilylation reaction. The catalysis is effected for example by platinum, platinum complexes, or platinum compounds, for instance H₂PtCl₆, or [pyridine] . [ethylene] PtCl₂. Preferred reaction temperatures are those between 50° and 140° C. However, other reaction conditions known from the chemistry of hydrosilylation also may be employed.

In this connection it is surprising that this addition reaction performed in the first step takes place essentially without secondary reactions and therefor may be repeated with good reproducibility. Proof of the reproducibility is manifested by the properties of the final products made in the second step of the inventive process.

The second step of the inventive process relates to the reaction of the X groups of the intermediate products with the terminal hydroxyl groups of the polyether alcohols. Such reaction processes are familiar from the manufacture of the polysiloxane-polyoxyalkylene mixed block polymerizates. The reaction partners are in the usual case polyethers with a terminal hydroxyl group which are obtained by the addition of alkylene oxides to alcohols. Preferred as alkylene oxides are ethylene oxide and propylene oxide. Employed as starting alcohols are preferably lower alcohols having 1 to 6 carbon atoms. Hereby are the polyether alcohols which are well known for the preparation of such mixed block polymerizates. The selection of the polyether alcohol employed for the formation of the polyoxyalkylene block depends hereby upon the purpose for which the products obtained from the process are intended to be used. These known rules of selection also may be employed here, and polyether alcohols having a specific molecular weight and a specific ratio of oxyethylene and oxypropylene may be used. Moreover, for the purpose of obtaining known effects, it is possible to add to the polyether monools specific amounts of polyether diols which are obtained by the addition of ethylene oxide or propylene oxide to water. It is also possible to employ polyether monools which have terminal phenoxy groups on one side. Such rules of selection have been disclosed in various places in the patent literature, for example in German Pat. Nos. 1,570,647, 1,694,366, and 1,930,546, and German Offenlegungsschriften Nos. 1,595,730 and 1,694,304.

As has been set forth hereinabove, the reaction of the X groups with the reactive polyethers takes place in known manner. Such a mode of proceeding has been described in German Pat. No. 1,040,251. Therein X is an alkoxy group which is exchanged by the interchange of ester radicals with cleaving-off of the corresponding alcohol for the polyoxyalkylene block. This reaction may be catalyzed by trifluoroacetic acid. Numerous variants of this process are known.

The reaction of the second process step is preferably carried out with siloxanes in which the primarily obtained intermediate products have as the X group a halogen group, preferably chlorine. Here again the reaction conditions are known and have been described, for example, in U.S. Pat. No. 3,115,512. Solvents are expediently used, and preferably those which render possible an azeotropic drying of the polyether, such as, for example, toluene or xylene. The reaction temperature will normally be from 10° to 80° C. The hydrogen halide liberated may be removed by evacuation, or by passing dry inert gas therethrough, or by intercepting it by means of an acid acceptor. The product obtained from the process may be stabilized against hydrolytic decomposition by the addition of a small amount of an amine, for example 0.1 to 5% by weight. Suitable amines are particularly alkanolamines, such as ethanolamine, dimethylethanolamine, and butylethanolamine.

The compounds obtained according to the present invention accordingly have the formula

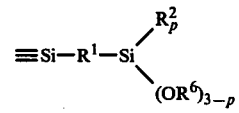

The group $R^1$ is therein a bivalent hydrocarbon group which corresponds to the alkenyl group $R^3$ with respect to the chain and the hydrocarbon number, but which is saturated by the addition. The group $OR^6$ corresponds to the polyoxyalkylene block and is derived from the polyether alcohol $R^6OH$ which already has been described in detail. The preferred molecular weight of the polyoxyalkylene block amounts in the mean to 400 to 6000, whereby the mean molecular weight may be determined by the alkylene oxides used in the addition of the alkylene oxides to the hydroxyl group-containing starting compound directly by the relation of alkylene oxide to starting alcohol, or may be attained by blending different addition products according to the respective intended field of use. The ethylene oxide content, based upon the total alkylene oxide, is preferably 15 to 100% by weight. If necessary, a part of the $R^6$ groups may be replaced by a lower alkyl group, which will be the case when polyoxyalkylene monools together with lower monovalent alcohols are reacted with the intermediate product in the second step of the process. According to the conditions recited in the claims, however, at least two polyoxyalkylene blocks are intended to be contained in the average molecule.

Examples of the inventive substances are compounds having the following average formulas:

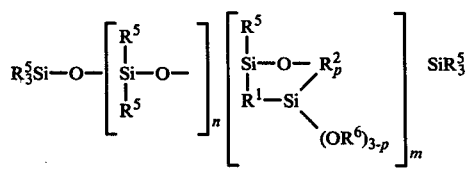

IX

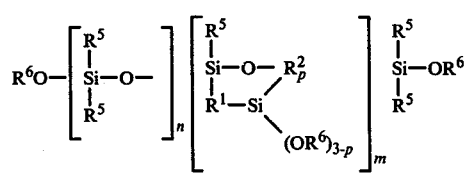

X

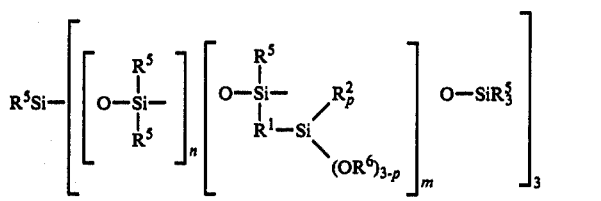

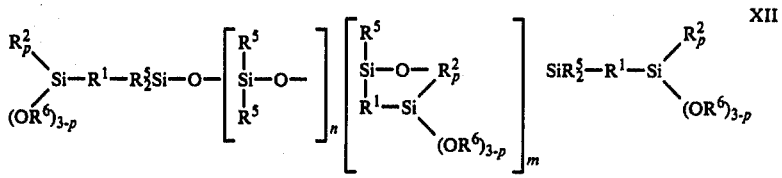

Preferred from among the aforementioned compounds are those in which the integer $p = 2$. If $p = 1$, a group P at the Si atoms which carry two $OR^6$ groups preferably may be a lower alkyl group, particularly one which is derived from a secondary alcohol, for example isopropanol. The carbon number of this alkyl group is not intended to exceed 6. Preferred are alkyl groups having 1 to 4 carbon atoms.

The compounds prepared according to the present invention may be employed generally for all the purposes for which polysiloxane-polyoxyalkylene mixed block polymerizates heretofore have been used. Thus, the compounds may be employed as textile aids, for example, as textile lubricants. They are also used in cosmetics, and further as antifoaming agents, particularly for aqueous systems at elevated temperatures, as well as emulsion breakers for O/W emulsions. The preferred field of application of the compounds prepared in accordance with the present invention is that of polyurethane foaming, and these compounds are used as foam stabilizers. The advantageous properties of the compounds prepared according to the present invention, namely their good reproducibility, together with the possibility of effecting the polyoxyalkylene block linkage both laterally and terminally are here of particular importance. As a result, the compounds prepared according to the present invention may be adapted in each case to the different foaming recipes. The selection and adaptation of the respective mixed block polymerizates to the foaming recipes may take place according to the known rules as described in the literature. Such publications are, for example, Frisch and Reegen, *Advances in Urethane Science and Technology*, Vol. I and II, Technomic Publishing Co., Westport, 1973; particularly vol. II, pages 221 et sequitur; *VDI Berichte* (VDI Reports), No. 182 (1972), pp. 171 to 176; Saunders and Frisch, *Polyurethanes, Chemistry and Technology*, Interscience Publishers, New York, 1962.

According to these literature references and the remainder of the state of the art, the following foam stabilizers are preferred, for example for the so-called one-shot process for preparing polyether-polyurethane soft foams: the foam stabilizers should have in the middle molecule 15 to 120 $R_2^5SiO$ structural units, and 3 to 20 $R^6$-groups. Preferred for this case are compounds with 30 to 100 $R_2^5SiO$ units and 3 to 10 $R^6$-groups, whereby the ratio of the aforementioned siloxane units to $R^6$-groups should be, in the middle molecule, 4 to 25, particularly 7 to 18. The preferred $R^5$ groups have already been referred to hereinabove. Particularly preferred is the methyl group. The polyoxyalkylene block should contain — based upon the weight of the block — 45 to 70% by weight of propylene oxide. The remainder should be made up of ethylene oxide. The average molecular weight of the polyoxyalkylene block is preferably 1000 to 3000. Preferred in this connection is the lower portion of this range, if the emphasis of the foam stabilizer effect is placed on the nucleation phase and the rising phase of the foam. If emphasis is placed instead on the capacity of the foam stabilizer to prevent a settling back of the foam at concentrations as small as possible, the molar weight of the polyoxyalkylene block is above 1700, if possible. It is also possible to employ differently structured polyoxyalkylene blocks within one and the same mixed block polymerizate.

In the polyethers making up the polyoxyalkylene blocks a terminal secondary hydroxyl group should be present. The different oxyalkylene units may be statistically distributed or added on in small blocks up to 6 alkylene oxide units.

Particularly preferred are compounds prepared as proposed by the process of the present invention that have the formula X

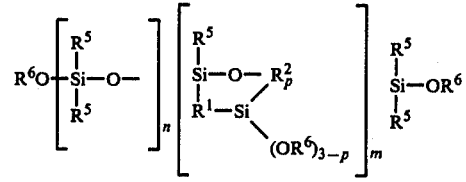

In these compounds the comb-like modification is combined with the terminal modification. At least two polyoxyalkylene blocks are contained in each molecule of the mixed block polymerizate.

The same compounds also may be employed as stabilizers for the preparation of polyurethane hard foams based on polyethers. However, if the polyethers to be foamed are very hydrophilic systems, for example those based on sugar alcohols, polyoxyalkylene blocks with 60 to 100% by weight of ethylene oxide and molecular weights between 600 and 2000 are advantageously used.

The inventive process as well as the properties of the products inventively prepared will be further described hereinafter on the basis of the following examples:

EXAMPLE 1

In this example, the inventive process is compared with the process of the art closest thereto. Prepared in each of the processes described are methylpolysiloxanes which are modified with polyoxyalkylene blocks in a comb-like manner. The ratio of polyoxyalkylene blocks to dimethylsiloxane units is the same in each case. Also identical are the polyoxyalkylene blocks employed.

(a) Process according to the state of the art in which polyether blocks with terminal allyl groups are added on to siloxane blocks with

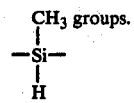

Employed as starting materials are polysiloxanes of the middle formula I wherein n = 18 and m = 3. The polysiloxanes were equilibrated by treatment with sulfuric acid. Used therein as the equilibrating agent were 23 grams of sulfuric acid/mole of siloxane at 10° C. The duration of equilibration was 12 hours. The acid was then removed by repeated washing. The polyether had been prepared by the addition of propylene- and ethylene oxide to n-butanol, whereby the propylene oxide and ethylene oxide were gradually added on in small blocks of 2.5 to 3 moles until a molar weight of 1820 was attained. The terminal block was composed of propylene oxide units. 58% of the polyoxyalkylene block was composed of oxypropylene units. The hydroxyl group of the polyether monool was converted quantitatively, by reaction with allyl chloride and sodium, into the oxyallyl group. Siloxane and the dry allyl polyether, in a 10% excess, were reacted with the use of platinum catalysts, indicated in Table I, in the presence of 2 liters of toluene/kilogram of siloxane. The reaction required 14 hours. By that time more than 93% of the SiH groups had reacted. According to the indications given in Table I, the mixed block polymerizates A, B, and C were obtained which were characterized by their viscosity and behavior during foam stabilization. The corresponding values are compiled in Table I.

(b) A further comparative product was prepared according to the process described on page 2 of the specification. The aforementioned siloxane was reacted under nitrogen and with the use of 1.1 liters of toluene/-kilogram reaction product and 1% by weight of tin-II-octoate (based on polysiloxane and polyether) as a catalyst with the same addition product of propylene oxide and ethylene oxide to butanol (as described above). The polyether monool previously had been dried azeotropically. It was employed in a 10% excess. After a 6-hour heating under reflux, the splitting-off of $H_2$ was complete. After the solvent had been distilled off, 0.3% by weight of ethanolamine was added. After filtering, there remained the mixed block polymerizate designated with D in Table I.

(c) The same siloxane was used for carrying out the inventive process. According to the indications in Table I, the siloxane was reacted, in the presence of different catalysts and under different reaction conditions, with dimethylvinylchlorosilane. Used therefor were, per each SiH group, 1.15 moles of dimethylvinylchlorosilane. The excess silane was distilled off at 70° C. More than 98% of the SiH groups had reacted. The reaction products were then reacted with the polyether of the comparative process described under (b) above. Employed was only a 10% excess of polyether monool, and 3 liters of toluene/kilogram reaction product were employed. The amount of $NH_3$ necessary for binding the hydrogen chloride liberated was passed through the reaction mixture at 50° C. while stirring. After distilling off the solvent, after the addition of 0.3% by weight of ethanolamine and filtering, the inventive products were obtained which have been identified in Table I with E, F, and G. These compounds correspond to the formula IX whereby $R^2$ and $R^5$ are methyl groups, $R^1$ is a $(CH_2)_2$-group; n has a value of 18; m has a value of 3, and p has a value of 2. The group $OR^6$ is derived from the polyether monool $R^6OH$ of the molecular weight 1820.

In Table I, accordingly, the mixed block polymerizates A to D are concordant in their structure and in the manner of being prepared correspond to the state of the art. The mixed block polymerizates E to G are mixed block polymerizates prepared in accordance with the process of the present invention.

TABLE I

| Mixed block polymerizate | Catalyst of the hydrosilylation | mMole Pt/SiH at the hydrosilylation | Temperature at the hydrosilylation ° C | Viscosity of the mixed block polymerizates cP, 20° C | Viscosity of an aqueous solution of the mixed block polymerizates cP, 20° C* | Foaming according to recipe I** | | | Stability of the product at elevated temperature*** |
|---|---|---|---|---|---|---|---|---|---|
| | | | | | | Height cm | Collapse cm | Thrust mm | |
| A | [pyridine] . [ethylene] . PtCl$_2$ | 0.45 | 120 | 2250 | >100,000 | 32.5 | 1.5 | 25 | yes |
| B | [pyridine] . [ethylene] . PtCl$_2$ | 0.225 | 110 | 1360 | 2,435 | 16.0 | 14.5 | not det. | not det. |
| C | H$_2$PtCl$_6$ . 6H$_2$O | 0.45 | 120 | 1110 | 445 | 29.0 | 2.5 | 71 | yes |
| D | See Example 1, process (b) | | | 2470 | 295 | 31.0 | 2.5 | 13 | no |
| E | [pyridine] . [ehtylene] . PtCl$_2$ | 0.046 | 90 | 870 | 135 | 30.5 | 1.0 | 8 | yes |
| F | [pyridine] . [ethylene] PtCl$_2$ | 0.046 | 120 | 840 | 141 | 30.5 | 0.5 | 30 | yes |
| G | H$_2$PtCl$_6$ . 6H$_2$O | 0.046 | 120 | 900 | 183 | 29.5 | 1.5 | 6 | yes |

It is apparent from Table I that the organopolysiloxanes modified with polyethers in a comb-like manner and made in accordance with the processes of the prior art are very dependent upon minor alterations of the process conditions. Accordingly, the reproducibility of the preparation thereof is poor. Therefore, it is also not possible to unequivocally determine the constitution of these comparative products, since it may vary depending upon the manufacturing conditions.

The products which are made according to the process of the present invention on the other hand show hardly any dependence upon the manufacturing conditions with respect to the properties thereof. A part thereof is particularly the good reproducibility of the rheological data. Significantly smaller quantities of platinum compounds are necessary for their manufacture. In contrast to the compounds of the process described on page 1 (see method a) of Example 1, the mixed block polymerizates according to the present invention are stable in storage and — as compared to the products known to the art — are generally notably improved in their foam-stabilizing properties.

EXAMPLE 2

Described in this example is the preparation of a product of formula X, where $R^2$ and $R^5$ are methyl groups, $R^1$ is the $(CH_2)_2$-group; n has a value of 40; m has a value of 3, and p has a value of 2. The residue $OR^6$ is derived from a polyether monool of the formula POH. This polyether monool is made by an equimolar blending of the alkylene oxide adduct to butanol having a molar weight of 1820 (as used in Example 1) with an analogous product which was different merely with regard to its molar weight, and whose molar weight was 3000.

The starting polysiloxane was prepared by partial hydrolysis of dimethyldichlorosilane and methyldichlorosilane. It corresponds to formula V, whereby the $R^5$-group is a methyl group, the group Y is chlorine; n has a value of 40, and m has a value of 3. This product was equilibrated by a 14-hour treatment with 1.46 moles of methane-sulfonic acid/mole of chlorosiloxane at 50° C. and subsequent separation of not built-in methane sulfonic acid. The polysiloxane contained $0.6 \cdot 10^{-3}$ val acid/grams. It was heated to 105° C. and a mixture of 1.15 moles of dimethylvinylchlorosilane and 0.045 mMole of the complex [pyridine] . [ethylene] . $PtCl_2$ per SiH group was added dropwise. The excess silane was distilled off at 70° C. and a pressure of 20 Torr. A residue remained whose acid value was $1.402 \cdot 10^{-3}$ val/grams. This value agrees with the theoretical value on the basis of the SiH content of the starting product of 0.958 val/grams. In the second process step this intermediate product was reacted with the above-mentioned polyether mixture. The mode of preparation corresponded to the mode of preparation for making the products E, F, and G of Example 1, but the quantity of toluene as solvent amounted to 4 l/kg of reaction product. The mixed block polymerizate obtained has been identified with reference letter H and has a viscosity of 2,937 cP at 20° C. The viscosity of the aqueous solution which was composed as indicated in the footnote to Table I amounts to 211 cP. The product is an excellent stabilizer for polyurethane soft foams. When this product is employed as a foam stabilizer in recipe I of Table I, 0.1 part by weight suffices, instead of the 0.6 part by weight of stabilizer indicated therein, to produce a stable foam. In concentrations of 0.01 to 0.1 part by weight, the product is suitable also as a cell regulator for so-called cold foams.

EXAMPLE 3

Described in this example is the preparation of a mixed block polymerizate according to the present invention having formula IX, wherein $R^2$ and $R^5$ are again methyl groups, $R^1$ is the $(CH_2)_2$ group; n has a value of 84, m has a value of 6, and p has a value of 1. $R^6OH$ represents a mixture of 50 mole % i-$C_3H_7OH$ and 50 mole % of the polyether monool of Example 2.

According to the inventive process (c) described in Example 1, an equilibrated siloxane having formula IV ($R^5 = CH_3$ group, n = 84, m = 6) was reacted with vinylmethylisopropoxy-chlorosilane under quantitative reaction at the SiH groups. The intermediate product was reacted with the polyether monool of Example 2 in the manner indicated in Example 2. Obtained is an inventive mixed block polymerizate J. The viscosity thereof was 17,780 cP at 20° C. The activator solution which already has been described in this composition had a viscosity of 356 cP. The product was found to be a very good foam stabilizer for polyurethane soft and hard foams according to the one-shot process based on polyethers.

EXAMPLE 4

Prepared in this example is an inventive mixed block polymerizate according to Example 2 with the difference that the values of n = 28.7 and m = 1.57. The starting siloxane wherein Y is chlorine had been equilibrated by heating with 0.01% by weight of $FeCl_3$ in a light HCl current. The addition of the vinylmethylbutylchlorosilane ($R^2$ = n-$C_4H_9$ group) took place at 90° C. The other parameters and experimental conditions were kept equal. Obtained was an inventive mixed block polymerizate K whose viscosity at 20° C. was 4110 cP. The activator solution, described in its composition in Table I, amounted to 238 cP at 20° C. The product was found to be a very good foam stabilizer. In the formulation of Table I, 0.25 part by weight is sufficient for the stabilization of the foam without the collapse amounting to more than 1 cm.

It will be obvious to those skilled in the art that many modifications may be made within the scope of the present invention without departing from the spirit thereof, and the invention includes all such modifications.

What is claimed is:

1. In the process for making a polyurethane foam, the improvement comprising use of a foam stabilizing amount of a mixture of polysiloxanepolyoxyalkylene block copolymerizates corresponding to the average formula

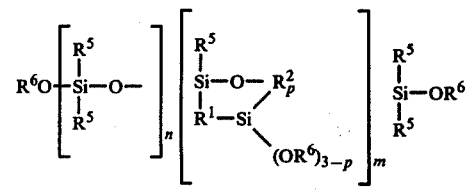

wherein $R^5$ is selected from the group consisting of alkyl-, phenyl-, —$CH_2$—Br, —$(CH_2)_3Cl$,

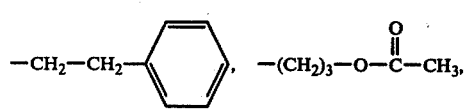

-continued

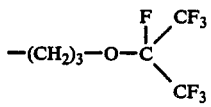

and —(CH$_2$)$_3$-O-alkyl groups, R$^1$ is a bivalent hydrocarbon group with 2 to 8 carbon atoms, R$^2$ is a trialkylsilyloxy group, or has the meaning of R$^5$, R$^6$ is a polyether alcohol group of an average molecular weight of about 400 to 6,000, resulting from the addition of ethylene oxide and propylene oxide to lower alcohols with 1 to 6 carbon atoms and/or corresponding to a lower alcohol, at least two R$^6$ groups in the average molecule being derived from said polyether alcohol, n is an integer with a value such that the average molecular weight of the siloxane block is about 500 to 12,000, m is an integer from 2 to 30, and p is an integer from 1 to 2.

2. A process according to claim 1 wherein R$^5$ is selected from the group consisting of —CH$_3$, —C$_2$H$_5$, n-C$_3$H$_7$, n-C$_8$H$_{17}$, and —(CH$_2$)$_2$—CH$_3$.

3. A process according to claim 1 wherein R$^5$ is a —CH$_3$ group, R$^1$ is selected from the group consisting of (CH$_2$)$_2$ and (CH$_2$)$_3$ groups, R$^2$ is selected from the group consisting of a lower alkyl group with 1 to 4 carbon atoms or a trimethylsilyloxy group, m is an integer from 3 to 15, and p is 2.

* * * * *

UNITED STATES PATENT OFFICE
CERTIFICATE OF CORRECTION

Patent No. 4,136,239           Dated January 23, 1979

Inventor(s) Gerd Rossmy

It is certified that error appears in the above-identified patent and that said Letters Patent are hereby corrected as shown below:

Formula IX, appearing at the bottom of columns 5 and 6 should read:

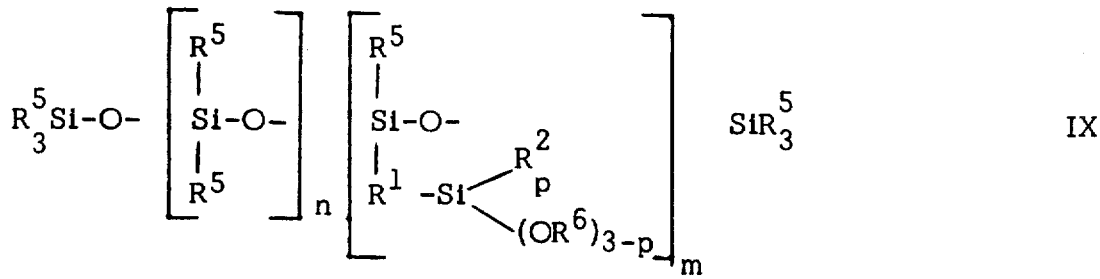

Formula X, appearing at the bottom of columns 5 and 6 should read:

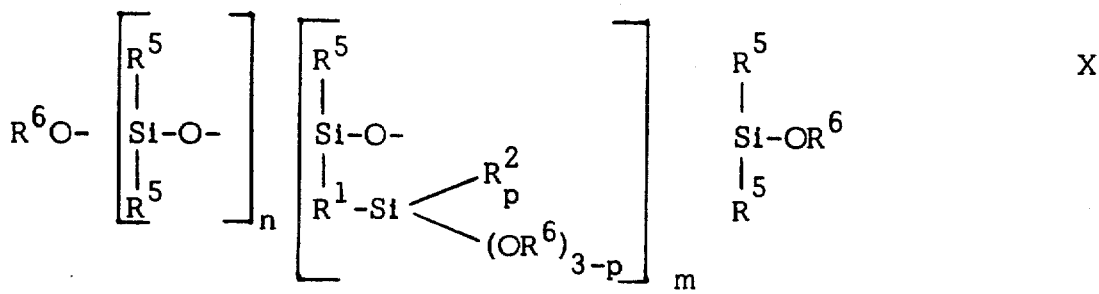

UNITED STATES PATENT OFFICE
CERTIFICATE OF CORRECTION

Patent No. 4,136,239  Dated January 23, 1979

Inventor(s) Gerd Rossmy

It is certified that error appears in the above-identified patent and that said Letters Patent are hereby corrected as shown below:

Formula XII, appearing at the top of columns 7 and 8 should read:

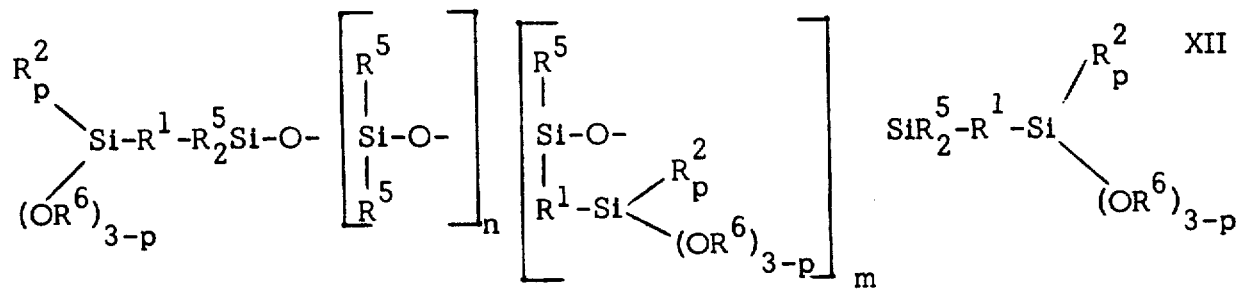

UNITED STATES PATENT OFFICE
CERTIFICATE OF CORRECTION

Patent No. 4,136,239                        Dated    January 23, 1979

Inventor(s)  Gerd Rossmy

It is certified that error appears in the above-identified patent and that said Letters Patent are hereby corrected as shown below:

Formula X appearing between lines 40 and 50 in column 8, should read:

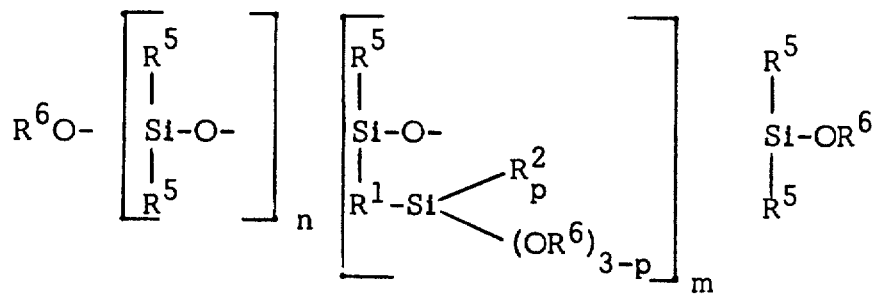

After Table I, column 10, prior to line 62, the following has been omitted and is to be inserted:

- - - *   The aqueous solution was composed of 20 parts by weight of mixed block polymerizate, 1 part by weight of diethylenetriamine, and 33 parts by weight of $H_2O$. Such a solution frequently must be transported by means of pumps during the polyurethane foaming.

**           The following recipe was employed:

100,000    parts by weight of polyol with an OH number of 47.5 and an ethylene oxide to propylene oxide ratio of 5 : 95, prepared by the addition of alkylene oxide to glycerin,

UNITED STATES PATENT OFFICE
CERTIFICATE OF CORRECTION

Patent No. 4,136,239                    Dated January 23, 1979

Inventor(s) Gerd Rossmy

It is certified that error appears in the above-identified patent and that said Letters Patent are hereby corrected as shown below:

| | | |
|---|---|---|
| 4.05 | parts | by weight of $H_2O$, |
| 3.00 | parts | by weight of trichlorofluoromethane, |
| 0.60 | part | by weight of siloxane-polyether block polymers, |
| 0.27 | part | by weight of tin octoate, |
| 0.15 | part | by weight of dimethylethanolamine, |
| 0.05 | part | by weight of N-ethylmorpholine, and |
| 52.50 | parts | by weight of toluylene diisocyanate T 80. |

The blending of the isocyanate with the mixture of the remaining components was effected with a stirring disc revolving at 2500 revolutions/min. The mixture capable of foaming was cast into square cartons having a surface area of approximately 27 x 27 centimeters. Produced were fine-celled foams which, for further hardening until becoming free from adhesiveness, were placed in a drying closet for 5 minutes at 140°C. The pressure head values were measured according to a method described in the periodical "Goldschmidt Informiert" (Goldschmidt Informs), 3/70, No. 12, pages 19-20. Those foams are satisfactory which have a pressure head of <50 millimeters. Sought to be attained was the combination of as low as possible a collapse with low pressure head values.

*** The products were stored for a week at 80°C. Thereafter, they were again utilized as stabilizers in recipe I. The heat stability was confirmed when the collapse of the foam compared to the starting value was no worse than 0.5 cm. - - -

UNITED STATES PATENT OFFICE
CERTIFICATE OF CORRECTION

Patent No. 4,136,239　　　　　　　　Dated January 23, 1979

Inventor(s) Gerd Rossmy

It is certified that error appears in the above-identified patent and that said Letters Patent are hereby corrected as shown below:

Column 12, Claim 1, the formula appearing between lines 50 and 60 should read as follows:

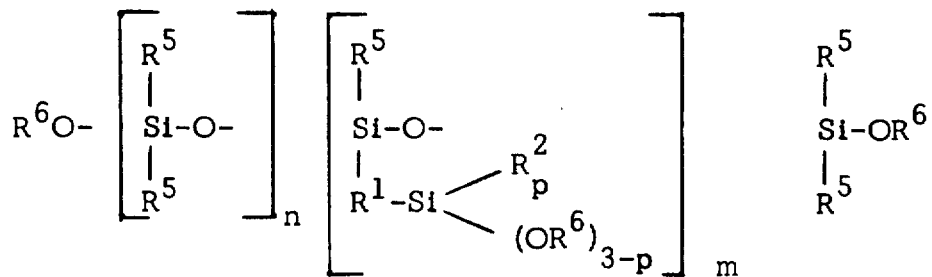

Signed and Sealed this

Twenty-ninth Day of May 1979

[SEAL]

Attest:

RUTH C. MASON
*Attesting Officer*

DONALD W. BANNER
*Commissioner of Patents and Trademarks*